United States Patent Office 3,054,683
Patented Sept. 18, 1962

3,054,683
CONTROL OF CHARACTERISTICS OF DEHYDRATED MASHED POTATOES
Carl E. Hendel, Roger M. Reeve, and George K. Notter, Berkeley, Calif., assignors to the United States of America as represented by the Secretary of Agriculture
No Drawing. Filed Oct. 4, 1960, Ser. No. 60,532
20 Claims. (Cl. 99—207)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates in general to the production of dehydrated mashed potatoes. A particular object of the invention is the provision of novel means for controlling the rehydration characteristics of dehydrated mashed potatoes, more particularly, to reduce the graininess of the product on rehydration. The objects of the invention include the products as new compositions of matter, as well as the processes for producing them. Further objects and advantages of the invention will be evident from the following description wherein parts and percentages are by weight, unless otherwise specified.

In the production of dehydrated mashed potatoes, an outstanding problem has been the prevention of stickiness in the reconstituted product. Considerable research has been devoted to this problem and at present various improvements have been made which make possible the production of products which are free from stickiness when reconstituted for consumption. The improved procedures have taken various forms including the incorporation of additives, such as glycerol monostearate or similar emulsifiers, or variation in the procedural conditions as initially cooking the potatoes at limited temperatures, pre-cooking the potatoes at low temperature before the regular cooking, various conditioning treatments of the cooked mash, etc. Although these measures have to a large measure remedied the problem of stickiness, they have given rise to a new problem in that the reconstituted product is grainy, that is, it does not have the smooth texture of mashed potatoes made from freshly-cooked potatoes. It may also be said that the reconstituted product is lacking in body, that is, there is a lack of continuity of the material so that the individual particles may be felt in the mouth when the product is consumed. Another point is that the reconstituted product tends to give a dry or "cottony" sensation in the mouth.

In accordance with the invention, the above defects are remedied by mixing with the product, after dehydration or during processing, a minor amount of a natural gum. The role of the gum in this connection is imperfectly understood but the fact remains that it corrects the situation. That is, the reconstituted product containing added gum has the desirable smooth texture of freshly-prepared mashed potatoes. In addition to eliminating graininess, the gum gives the reconstituted product the proper body or continuity so that the particles cling together as with freshly-prepared mashed potatoes. Moreover, the product of the invention provides the proper sensation of moistness when the product is tasted, that is, the dry or cottony sensation is eliminated. It is further to be emphasized that these desirable changes are attained without rendering the reconstituted product sticky or gummy.

Various gums can be employed in applying the invention as, for example, carragheen, algin, pectin, low-methoxyl pectins, guar, karaya, arabic, tragacanth, agar, locust bean, acacia, or other natural edible polysaccharide gums. One may employ a single, individual gum or mixtures of two or more different ones. Gums that contain —COOH groups, such as algin, or —OSO$_3$H groups, such as carragheen, may be used in the acid condition or in the form of their sodium, potassium, ammonium, or calcium salts. The amount of gum used in accordance with the invention may be varied from about 0.05 to 1% (based on dry weight of the potato material), depending on such factors as the properties of the gum selected, the character of the potato material, and the properties desired in the final product. In general, it is preferred to use about 0.5% of the gum. It is to be emphasized that our investigations have demonstrated that the natural gums have a unique ability to eliminate graininess in dehydrated potato products whereas synthetic gums such as carboxymethyl cellulose do not have this ability.

As noted hereinabove, the gum may be added after the dehydrated potatoes are prepared or may be added at any stage in their processing. Where the gum is added to the dehydrated product, it is preferred that the gum be in finely-divided condition so that it can be intimately mixed with the potato product which is generally in granule or flake form. To assist in the incorporation, the gum may be diluted with non-fat milk solids or other powdered edible material which is suitable for addition to dehydrated mashed potatoes. In a preferred modification of the invention, the gum is incorporated with the potatoes during processing, for example, in the stage when the potatoes, after cooking, are mashed. In this way an added benefit is achieved in that the potato material can be granulated more readily and without rupture of cell walls. This is a significant advantage in that it permits one to use smaller granulation equipment while achieving the same through-put of material. Also, conditioning times can be decreased without running danger of cell rupture during the granulation step. In adding the gum during processing, the gum may be in solid form, or dissolved in water, or diluted with non-fat milk solids, etc. The step of adding a gum may be incorporated into any conventional system for producing dehydrated mashed potatoes. As an example, the invention may be applied to a system wherein potatoes are subjected to a series of steps including cooking, mashing, conditioning, and dehydration in granule or flake form. Many different procedures for preparing dehydrated mashed potatoes are known in the art and form no part of the present invention per se although the invention may be applied in combination with these processes to yield the benefits described above.

Another aspect of the invention concerns the use of natural gums in conjunction with starch-complexing agents to attain a synergistic effect in improving the properties of reconstituted dehydrated potato products. Thus, for example, a given dehydration process may yield a product which is sticky when reconstituted. If it is attempted to correct this defect by addition of an emulsifier it will be found that although the stickiness is obviated, the reconstituted product is rendered grainy. However, it has been found that if to such a product is added both a gum and an edible starch-complexing agent, the stickiness is obviated without development of graininess. In applying this aspect of the invention the natural gum and starch-complexing agent are incorporated with the potato product after dehydration, or, they may be incorporated with the potato material during processing at any stage prior to completion. When the gum and starch-complexing agent are added to the dehydrated product it is preferred that they be added in finely-divided form. For example, the gum an starch-complexing agent may be formed into an aqueous suspension which is then dehydrated to a solid state and finely powdered and mixed with the dehydrated potato product. The gum and starch-complexing agent may also be diluted with non-fat milk solids for facility in incorporating them with the dried potato material. Such expedients as grinding while cooled with solid $CO_2$ may be used to form the gum and/or starch-complexing agent into very fine particles suitable for incorporation with dehydrated potato products. Generally, each agent gum and starch-complexing agent, is added in proportion of about 0.05 to 1%, based on dry weight of the potato material.

Various categories of starch-complexing agents may be used in conjunction with natural gums in accordance with the invention, illustrative examples being given below:

Mono- and di-glycerides of fat acids such as glycerol monolaurate, glycerol monomyristate, glycerol monopalmitate, glycerol monostearate, glycerol monooleate, etc. (The term "fat acid" is employed herein to designate the fatty acids containing eight or more carbon atoms, also referred to as higher fatty acids.)

Mono- and di-esters of sucrose and fat acids. Illustrative of this class are sucrose monolaurate, monopalmitate, monostearate, monooleate, dilaurate, dipalmitate, distearate, palmitate-oleate, etc.

Fat acid esters of inner ethers of hexitols. Illustrative of this class are sorbitan monolaurate, monomyristate, monopalmitate, monostearate, monooleate, etc. The corresponding esters of mannitan may also be used.

Condensation products of ethylene oxide with the mono- or di-fat acid esters of sorbitan or mannitan. Typical of these compounds are ethylene oxide condensates of sorbitan monolaurate, sorbitan monomyristate, sorbitan monopalmitate, sorbitan monostearate, sorbitan monooleate, and the like. These condensates may contain anywhere from 6 to 60 moles of ethylene oxide per mole of sorbitan monoester.

Lactic acid esters of mono- or di-glycerides; acetyl tartaric acid esters of mono- or di-glycerides; lecithins; cephalins; lipositols, etc.

A preferred class of starch-complexing agents are the fat acids, more particularly their salts with sodium, calcium, aluminum, or magnesium. Included in this category are the individual fat acids such as lauric, myristic, palmitic, stearic, oleic, linoleic, and the mixed fat acids obtained by hydrolysis of natural fats and oils or partly or completely hydrogenated fats and oils. Coming into special consideration in this category are calcium stearate, magnesium stearate, and the calcium or magnesium salts of mixed fat acids derived from natural or hydrogenated fats and oils.

Particularly useful additives are those which may be described as salts, complexes, or co-precipitates and which contain a fat acid, a natural gum, and a polyvalent metal such as magnesium, calcium, or aluminum. These compositions may be considered as salts wherein the polyvalent metal is joined to the fat acid and to the gum through carboxylic acid groups just as one may obtain, for example, a mixed salt such as calcium acetate-propionate. In other words, these salts have a common cationic portion—the polyvalent metal—and different anionic groups derived from the fat acid and the gum. As well known in the art, many natural gums contain carboxylic groups and are thus capable of forming such salts. Similar results are attained with natural gums which contain —$OSO_3H$ groups. It may be, however, that the materials are not true salts but complexes wherein the polyvalent metal, fat acid, and gum are combined through chemical bonds other than the usual salt-forming linkages or it may be that only physical forces are involved. For this reason the compositions may be referred to generically as polyvalent metal-fat acid-natural gum complexes.

In a typical method for preparing these complexes an aqueous preparation is formed containing the (1) fat acid, or, more preferably a sodium or potassium salt thereof, and (2) the gum, either in acid form or in the form of a sodium or potassium salt. To this preparation is added a salt of calcium, magnesium, or aluminum; any water-soluble, non-toxic salt of these metals can be used since the anion of the salt is of no concern to the process. Thereby the polyvalent metal-fat acid-natural gum complex is formed, usually as a precipitate or suspended material. This product may be separately recovered and separated from soluble salts but usually this is unnecessary and the entire mixture is added to the potato material, or preferably, the entire mixture is dried. After drying, it may be finely ground especially if it is to be incorporated with a previously-dried potato product. Grinding of the product is facilitated if it is kept cooled, for example, with Dry Ice. The polyvalent metal-fat acid-natural gum complex is generally added to the potato material in a proportion of about 0.1 to 2%, usually 0.5 to 1%, based on dry weight of the potato solids.

As noted hereinabove, the additives herein described may be added to previously-dried potato products, or, they may be added to the products at any stage prior to final dehydration. In applying the invention in the latter manner, the procedure used for preparing the dehydrated potatoes may be any of those described in the literature. It is preferred, however, to produce the dehydrated products by the methods described in the Hendel et al. patent application, Serial No. 15,511, filed March 16, 1960. Briefly described, the process involves these steps: Fresh potatoes are cooked, mashed, then partially dehydrated to a moisture content of about 50–75%. The partially dehydrated mash is then cooled and conditioned until it loses its doughy texture. Next, the conditioned mash is treated to subdivide it into minute particles without causing cell rupture. This is accomplished by subjecting it to rotating paddles under conditions of mild compression and mild shear forces so that the subdivision is effectively accomplished without damage to cells. Preferably, during this subdivision or granulation step a current of warm air is passed over the mash whereby to achieve concurrent dehydration. This assists materially in attaining effective size reduction of the particles without cell damage. The resulting product, where necessary, is given a final finish-drying in conventional fluidized-bed or pneumatic driers. Where the process of the present invention is applied to the aforesaid procedure, the additives may be incorporated at any step. A convenient plan is to do the incorporation during or after the step in which the cooked potatoes are mashed. For best results the additives should be present in the stage in which the potato material is granulated or subdivided as their presence materially assists in attaining fine particle size without cell rupture. In such manner, one is enabled to attain dehydrated potato products of minimum stickiness and graininess.

Where the additive—that is, the natural gum, alone, or in conjunction with a starch-complexing agent—is added to the potato material during processing, it is often advantageous to also add a minor proportion—about 0.1 to 2%, based on dry potato solids—of a triglyceride. The triglyceride acts as a lubricant and further assists in attaining ready granulation of the potato material without damage to individual cells. As the triglyceride one may employ cottonseed oil, coconut oil, hydrogenated coconut oil, peanut oil, corn oil, or other edible fat or oil, in natural or hydrogenated condition.

The invention is further demonstrated by the following illustrative examples:

*Example I*

A lot of commercial dehydrated potato granules was procured. Reconstitution tests on the product indicated that it formed a reconstituted mash which was not sticky but was grainy.

Samples of the granules were mixed with various gums, the latter being in a finely-divided condition. In each case the proportion of gum was 0.5%. The gums used are listed in the table below.

Samples of the original granules and those containing added gum were reconstituted using 20 grams of potato product and 100 ml. of boiling liquid consisting of one-fourth volume milk, three-fourths volume water. The reconstituted products were let stand 15 minutes after reconstitution, then at a product temperature of 110° F. were submitted to a taste panel for evaluation. The results are set forth below:

Additive: Graininess score [1]
- None (control) _____ 4.0
- Guar gum _____ 3.2
- Locust bean gum _____ 2.0
- Carragheen _____ 2.0
- Gum karaya _____ 2.0
- Sodium alginate _____ 2.5
- Low-methoxyl pectin _____ 3.0

[1] Graininess was scored on the basis of 1 for no graininess; 5 for very grainy.

It was also observed that there was no stickiness in any of the reconstituted products.

*Example II*

A lot of commercial dehydrated potato granules was procured. Reconstitution tests on the product indicated that it formed a reconstituted mash which was very sticky.

Samples of the granules were mixed with various additives, the latter being in a very finely-divided condition in each case. The additives used and the proportion thereof are set forth in the following table. For comparative purposes several runs were made with addition of an emulsifier alone, illustrating the disadvantageous results obtained thereby.

Control portions of the granules and the lots containing the additives were reconstituted using 20-gram portions of granules and 88 ml. of liquid at 170° F. The liquid contained one-fourth volume of milk, three-fourths volume of water and 1 teaspoon of salt per quart of liquid.

The reconstituted products were submitted to a taste panel for evaluation of stickiness and graininess. The results are tabulated below:

Graininess was scored on a basis of 1 for no graininess; 5 for very grainy.

Stickiness was scored on a basis of 1 for no stickiness; 5 for very sticky.

Proportions of additives are given in the tables as percent, based on the weight of potato granules.

A. EFFECT OF SODIUM STEARATE, ALONE, OR IN CONJUNCTION WITH CARRAGHEEN

| Run | Additive | Stickiness | Graininess |
|---|---|---|---|
| 1 | None (control) | 4.0 | 1.5 |
| 2 | Sodium stearate (1%) | 1.5 | 2.8 |
| 3 | Sodium stearate (1%) and carragheen (0.2%) | 1.5 | 1.8 |

B. EFFECT OF GLYCEROL MONOSTEARATE, ALONE, OR IN CONJUNCTION WITH CARRAGHEEN

| Run | Additive | Stickiness | Graininess |
|---|---|---|---|
| 4 | None (control) | 4.0 | 1.5 |
| 5 | Glycerol monostearate (1%) | 2.1 | 2.5 |
| 6 | Glycerol monostearate (1%) and carragheen (0.2%) | 1.9 | 1.6 |

In runs 5 and 6 the glycerol monostearate was finely subdivided by blending with non-fat milk solids (1% of the weight of potato granules), the mixture being cooled with Dry Ice during mixing and the product then incorporated with the potato granules.

C. EFFECTS OF CALCIUM STEARATE AND VARIOUS POLYVALENT METAL STEARATE-GUM COMPLEXES

| Run | Additive | Stickiness | Graininess |
|---|---|---|---|
| 7 | None (control) | 4.0 | 1.5 |
| 8 | Calcium stearate (1%) | 2.2 | 2.5 |
| 9 | Calcium stearate-alginate (1.2%) | 1.7 | 1.2 |
| 10 | Magnesium stearate-alginate (1.1%) | 2.0 | 1.5 |
| 11 | Calcium stearate-locust bean gum complex (0.5%) | 2.3 | 2.0 |

The calcium stearate-alginate used in run 9 was prepared as follows: Five parts of stearic acid was converted to sodium stearate by reaction with sodium hydroxide. The sodium stearate and 1 part of sodium alginate were dissolved in 150 parts of water at about 150° F. To this solution was added a calcium chloride in quantity sufficient to furnish ½ mole of calcium per mole of stearic acid. The reaction mixture was stirred vigorously, then poured into a pan and dried in a current of air at about 170° F. The dried product was ground to about 200-mesh while cooling with Dry Ice.

The magnesium stearate-alginate of run 10 was made in the same manner as the corresponding calcium derivative excepting that magnesium sulphate was used instead of calcium chloride.

The additive of run 11 was made in the same manner as the calcium stearate-alginate of run 9 except that the sodium alginate was replaced by the same proportion of locust bean gum.

*Example III*

California Russet Burbank potatoes were washed, peeled, trimmed, cut into ¾ inch thick slices, dipped one minute in a 0.1% solution of sodium bisulphite, then cooked 60 minutes in a steam-air mixture at 190° F.

The cooked potatoes were divided into two lots, each being riced through a ½-inch mesh screen, then mixed in a planetary mixer (60 r.p.m.) for one minute with an emulsion (composition given below) equal in amount to 10% of the weight of the potatoes at the beginning of the mixing.

In run 1, the emulsion was an aqueous emulsion containing 1% carragheen, 1% glycerol monostearate, and 0.09% $NaHSO_3$. (This is equivalent to approximately 0.5% carragheen and 0.5% glycerol monostearate in the final dry potato product.)

In run 2, the emulsion was as above except the carragheen was omitted.

The two lots of potatoes containing the additives were each processed further as follows:

The mash containing the additive was dried on a single drum drier at 250° F., approximately 2 r.p.m. to a moisture content of 50%.

The partly-dried mash was then placed on a belt equipped with a blower for passing air over its surface. The mash was thus cooled to room temperature and conditioned at such temperature for 3 hours. During this conditioning period the following manipulations were applied: After ½ hour, the mash was subjected to the action of rotating blades to reduce the size of clumps and aid in equilibration of moisture content. After 2 hours the mash was passed between 12-inch diameter mashing rolls at room temperature—0.01 inch clearance, 3 r.p.m. This formed the potatoes into a friable, discontinuous sheet very easily separated into individual particles that did not re-agglomerate. After the third hour of conditioning the potatoes were again passed through the mashing rolls to form a very friable product. This product was then placed in a trough granulator drier (as disclosed in the application of Hendel et al., Ser. No. 15,511, filed March 16, 1960), wherein the material was subjected to a current of air at 130° while rotating paddles at 6 r.p.m. effected a repeated subdivision of the mash under mild compression and mild shear forces. In about 20 minutes the product had been dried in the form of granules. The granules were then finish-dried in a fluidized bed drier to produce granules of about 6% moisture content.

Samples of the two products were reconstituted as described in Example II and appraised by a taste panel for stickiness and graininess. The results are tabulated below:

| Run | Additive | Stickiness [1] | Graininess [2] |
|---|---|---|---|
| 1 | Glycerol monostearate (0.5%) and carragheen (0.5%) | 1.7 | 2.0 |
| 2 | Glycerol monostearate (0.5%) | 2.7 | 2.7 |

[1] Stickiness scored on a basis of 1 for no stickiness; 5 for very sticky.
[2] Graininess scored on a basis of 1 for no graininess, 5 for very grainy.

Example IV

California Russet Burbank potatoes were washed, peeled, trimmed, and cut into pieces ½" x ½" x ¾". The pieces were washed one minute in water containing 0.1% $NaHSO_2$ for light sulphiting and removal of free starch.

The potato pieces were cooked 10 minutes in steam at 212° F. and riced through a ½-inch mesh screen. The riced potatoes were mixed for one minute in a planetary mixer (60 r.p.m.) with addition of 5% of their weight of water containing approximately 0.2% $NaHSO_3$.

The potato mash was placed in trays in a layer ½ inch deep and frozen at 0° F. Freezing time was about 20 minutes. The frozen material was then thawed in a rotary drier with air at 150° F., thawing time was about 20 minutes.

The thawed mash was then divided into two lots, different additives being incorporated in each as follows:

Run A: Four and five-tenths grams of commercial glycerol monostearate and 9 grams of hydrogenated coconut oil were emulsified in 225 grams of water at 150° F. The resulting emulsion was incorporated into the potato mash to provide about 1% glycerol monostearate and 2% hydrogenated coconut oil, on a dry potato solids basis.

Run B: The emulsion in this case was as in run 1 but also contained 2.25 grams of gum karaya. The emulsion was added to the mash to furnish: glycerol monostearate 1%; hydrogenated coconut oil 2%; and gum karaya 0.5%, all on a dry potato solids basis.

The two lots of potatoes containing the additives were each processed as follows:

The mash was dried for 15 minutes in a shaker screen drier equipped with two sets of blades rotating at about 30 r.p.m. to fluff the product during drying. Air at 150° F. was passed through the screen during this operation. The partly-dried product was then passed between 12-inch diameter mashing rolls at room temperature—0.01 inch clearance, 3 r.p.m. The moisture content at this point was 62%. The product was then equilibrated for 15 minutes—product temperature being about 100° F. The equilibrated product was then treated in the shaker screen drier again for 3 minutes exposing it to air at 80° F. to cool it. The product now at about 70° F. was again put through the mashing rolls.

The product was now placed in a trough granulator drier (as disclosed in the application of Hendel et al., Ser. No. 15,511, filed March 16, 1960) wherein the material was subjected to a current of air at 130° F. while rotating paddles at 6 r.p.m. effected a repeated subdivision of the mash under mild compression and mild shear forces. In about 30 minutes the product had been dried in the form of granules—moisture content about 20%. The granules were then finish-dried in a fluidized bed drier to produce granules of about 6% moisture content.

Samples of the two products were reconstituted as described in Example II and appraised by a taste panel for stickiness and graininess. The results are tabulated below:

| Run | Additive | Stickiness [1] | Graininess [2] |
|---|---|---|---|
| A | Glycerol monostearate 1% and hydrogenated coconut oil 2%. | 1.0 | 4.5 |
| B | Glycerol monostearate 1%; hydrogenated coconut oil 2%; and gum karaya 0.5%. | 1.5 | 2.8 |

[1] Stickiness scored on a basis of 1 for no stickiness; 5 for very sticky.
[2] Graininess scored on a basis of 1 for no graininess; 5 for very grainy.

Having thus described the invention, what is claimed is:

1. A composition of matter comprising, in intimate admixture, a major proportion of dehydrated mashed potato and a minor proportion of a natural gum sufficient to improve the texture of the product on reconstitution, the amount of said natural gum being at least 0.05% based on the dry weight of the potato material.

2. A composition of matter comprising, in intimate admixture, a major proportion of dehydrated mashed potato and a minor proportion of a natural gum and a starch-complexing agent sufficient to improve the texture of the product on reconstitution, the amount of said natural gum being at least 0.05% based on the dry weight of the potato material.

3. A composition of matter comprising, in intimate admixture, a major proportion of dehydrated mashed potato and a minor proportion of a polyvalent metal-fat acid-natural gum complex sufficient to improve the texture of the product on reconstitution, the amount of said complex being at least 0.1% based on the dry weight of the potato material.

4. A composition of matter comprising, in intimate admixture, a major proportion of dehydrated mashed potato and a minor proportion of a natural gum, a starch-complexing agent, and a triglyceride, sufficient to improve the texture of the product on reconstitution, the amount of said natural gum being at least 0.05% based on the dry weight of the potato material.

5. A process for improving the reconstitution properties of dehydrated mashed potato which comprises mixing with dehydrated mashed potato a minor proportion of a natural gum sufficient to improve the texture of the product on reconstitution, the amount of said natural gum being at least 0.05% based on the dry weight of the potato material.

6. A process for improving the reconstitution properties of dehydrated mashed potatoes which comprises intimately mixing with dehydrated mashed potato a minor proportion of a natural gum in finely-divided form sufficient to improve the texture of the product on reconstitution, the amount of said natural gum being at least 0.05% based on the dry weight of the potato material.

7. A process for improving the reconstitution properties of dehydrated mashed potatoes which comprises intimately mixing with dehydrated mashed potato a minor proportion of a natural gum and a starch-complexing agent sufficient to improve the texture of the product on reconstitution, the amount of said natural gum being at least 0.05% based on the dry weight of the potato material.

8. A process for improving the reconstitution properties of dehydrated mashed potatoes which comprises intimately mixing with dehydrated mashed potato a minor proportion of a polyvalent metal-fat acid-natural gum complex sufficient to improve the texture of the product on reconstitution, the amount of said complex being at least 0.1% based on the dry weight of the potato material.

9. A process for improving the reconstitution properties of dehydrated mashed potatoes which comprises intimately mixing with dehydrated mashed potato a minor proportion of a natural gum, a starch-complexing agent, and a triglyceride, sufficient to improve the texture of the product on reconstitution, the amount of said natural gum being at least 0.05% based on the dry weight of the potato material.

10. In the process of preparing dehydrated mashed potato wherein potatoes are subjected to a series of operations including cooking, mashing and dehydration, the improvement which comprises mixing with the potato material a minor proportion of a natural gum sufficient to improve the texture of the product on reconstitution, the amount of said natural gum being at least 0.05% based on the dry weight of the potato material.

11. The process of claim 10 wherein the gum is added to the potato material prior to dehydration.

12. The process of claim 10 wherein the gum is added to the potato material subsequent to dehydration.

13. In the process of preparing dehydrated mashed potato wherein potatoes are subjected to a series of operations including cooking, mashing, and dehydration, the improvement which comprises mixing with the potato material a minor proportion of a natural gum and a starch-complexing agent sufficient to improve the texture of the product on reconstitution, the amount of said natural gum being at least 0.05% based on the dry weight of the potato material.

14. In the process of preparing dehydrated mashed potato wherein potatoes are subjected to a series of operations including cooking, mashing, and dehydration, the improvement which comprises mixing with the potato material a minor proportion of a polyvalent metal-fat acid-natural gum complex sufficient to improve the texture of the product on reconstitution, the amount of said complex being at least 0.1% based on the dry weight of the potato material.

15. In the process of preparing dehydrated mashed potato wherein potatoes are subjected to a series of operations including cooking, mashing, and dehydration, the improvement which comprises incorporating with the potato material a minor proportion of a natural gum, a starch-complexing agent, and a triglyceride, sufficient to improve the texture of the product on reconstitution, the amount of said natural gum being at least 0.05% based on the dry weight of the potato material.

16. The composition of claim 1 wherein the natural gum is karaya gum.

17. The composition of claim 1 wherein the natural gum is carragheen.

18. The composition of claim 1 wherein the natural gum is sodium alginate.

19. The composition of claim 1 wherein the natural gum is locust bean gum.

20. The composition of claim 1 wherein the natural gum is present in an amount of about from 0.05 to 1%, based on the dry weight of potato solids.

References Cited in the file of this patent

UNITED STATES PATENTS

| | | |
|---|---|---|
| 2,599,519 | Stevens | June 3, 1952 |
| 2,785,075 | Malecki | Mar. 12, 1957 |
| 2,788,281 | Guadagni | Apr. 9, 1957 |

OTHER REFERENCES

Potato Processing (Talburt and Smith), published by Avi Publishing Co., 1959, pp. 334–335.